(12) United States Patent
Suzuki

(10) Patent No.: US 7,130,728 B2
(45) Date of Patent: Oct. 31, 2006

(54) VEHICLE STEERING APPARATUS AND METHOD FOR CONTROLLING THE SAME

(75) Inventor: Hiroshi Suzuki, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 207 days.

(21) Appl. No.: 10/795,324

(22) Filed: Mar. 9, 2004

(65) Prior Publication Data

US 2004/0193344 A1 Sep. 30, 2004

(30) Foreign Application Priority Data

Mar. 27, 2003 (JP) .............................. 2003-088881

(51) Int. Cl.
*G62D 6/00* (2006.01)
*G06F 17/00* (2006.01)

(52) U.S. Cl. ......................... 701/41; 701/42; 180/402; 180/413

(58) Field of Classification Search ................. 701/41, 701/42; 180/402, 422, 411–413, 421
See application file for complete search history.

(56) References Cited

U.S. PATENT DOCUMENTS

| | | | | |
|---|---|---|---|---|
| 5,828,972 A | * | 10/1998 | Asanuma et al. ............. | 701/41 |
| 5,988,312 A | * | 11/1999 | Nishino et al. ............. | 180/446 |
| 6,208,923 B1 | * | 3/2001 | Hommel ....................... | 701/42 |
| 6,548,969 B1 | * | 4/2003 | Ewbank et al. ............... | 318/34 |
| 6,687,590 B1 | * | 2/2004 | Kifuku et al. ................ | 701/43 |
| 6,885,922 B1 | * | 4/2005 | Yao et al. ..................... | 701/29 |
| 6,904,346 B1 | * | 6/2005 | Higashi et al. ............... | 701/41 |
| 2002/0093298 A1 | | 7/2002 | Walter | |
| 2003/0098197 A1 | * | 5/2003 | Laurent et al. ............. | 180/401 |
| 2003/0114969 A1 | | 6/2003 | Dominke et al. | |

FOREIGN PATENT DOCUMENTS

| | | |
|---|---|---|
| DE | 100 52 343 A1 | 7/2002 |
| JP | 10-211885 | 8/1998 |
| JP | 11-078943 | 3/1999 |
| JP | 2000-043737 | 2/2000 |
| JP | 2002-37112 | 2/2002 |
| JP | 2002-037112 * | 6/2002 |
| JP | 2003-026020 | 1/2003 |
| WO | WO 01/72571 A3 | 10/2001 |

* cited by examiner

*Primary Examiner*—Tan Nguyen
(74) *Attorney, Agent, or Firm*—Oblon, Spivak, McClelland, Maier & Neustadt, P.C.

(57) ABSTRACT

A steer-by-wire steering apparatus for a vehicle has a first control system including a first ECU, and a second control system including a second ECU. Each ECU responds to manipulation of the steering wheel by a driver, and controls a steering motor. The first ECU determines whether the second control system is malfunctioning, and the second ECU determines whether the first system is malfunctioning. When any of the system is malfunctioning, the ECU of normally functioning system controls a counter force motor such that steering wheel receives a counter force that is different from that when both systems are functioning normally. Accordingly, the steering apparatus is capable of speedily and reliably causing a driver to realize a malfunction in the steering apparatus.

20 Claims, 8 Drawing Sheets

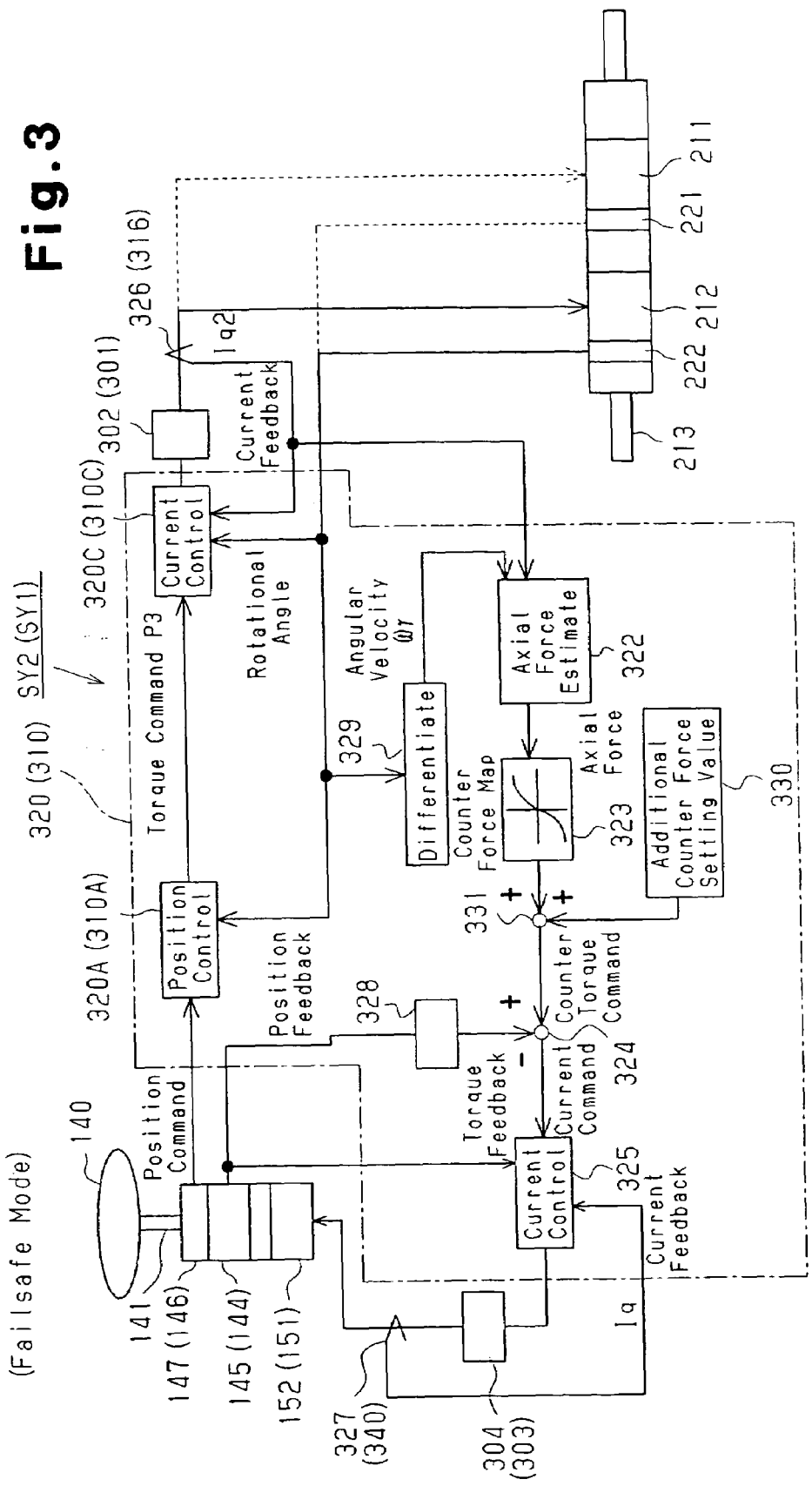

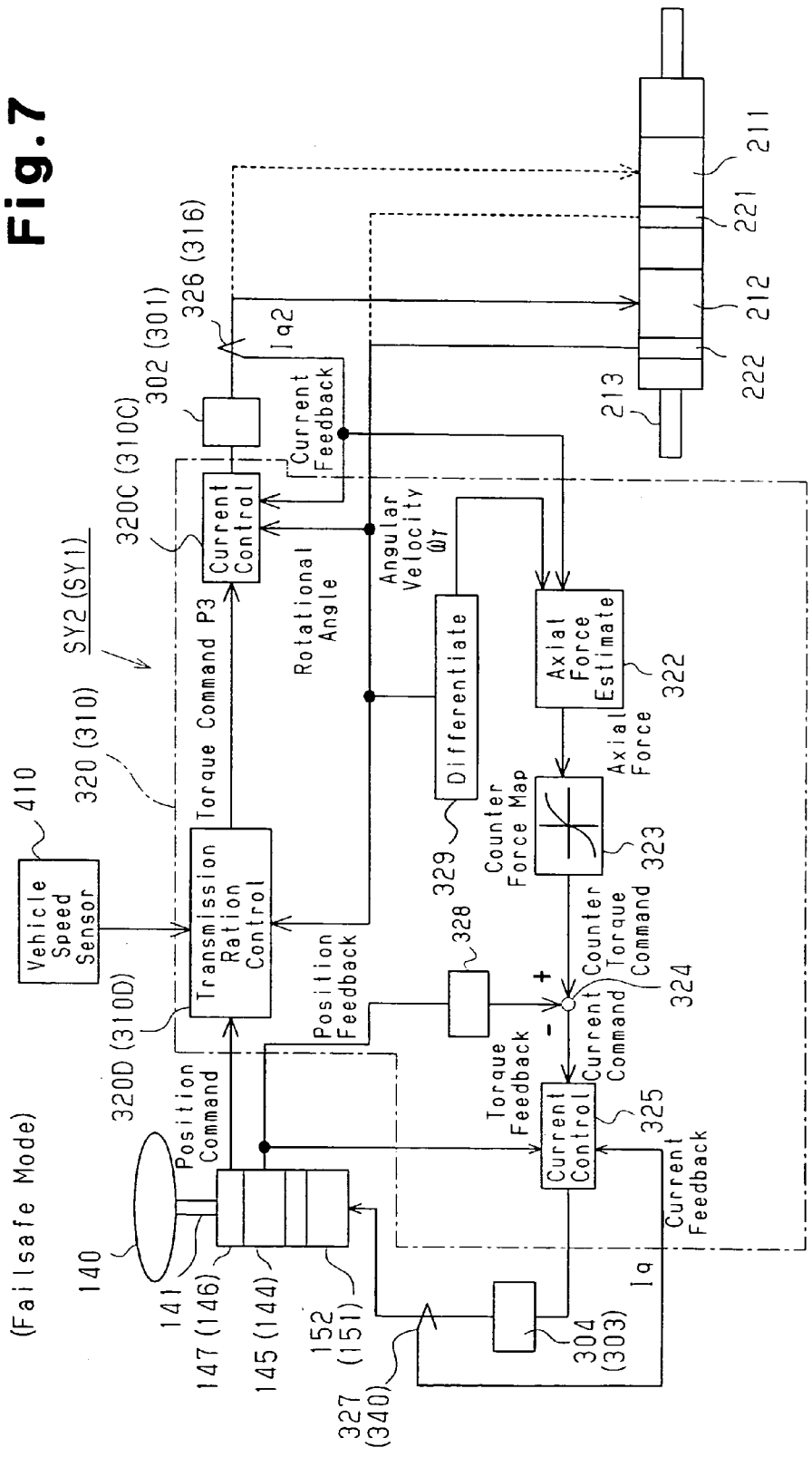

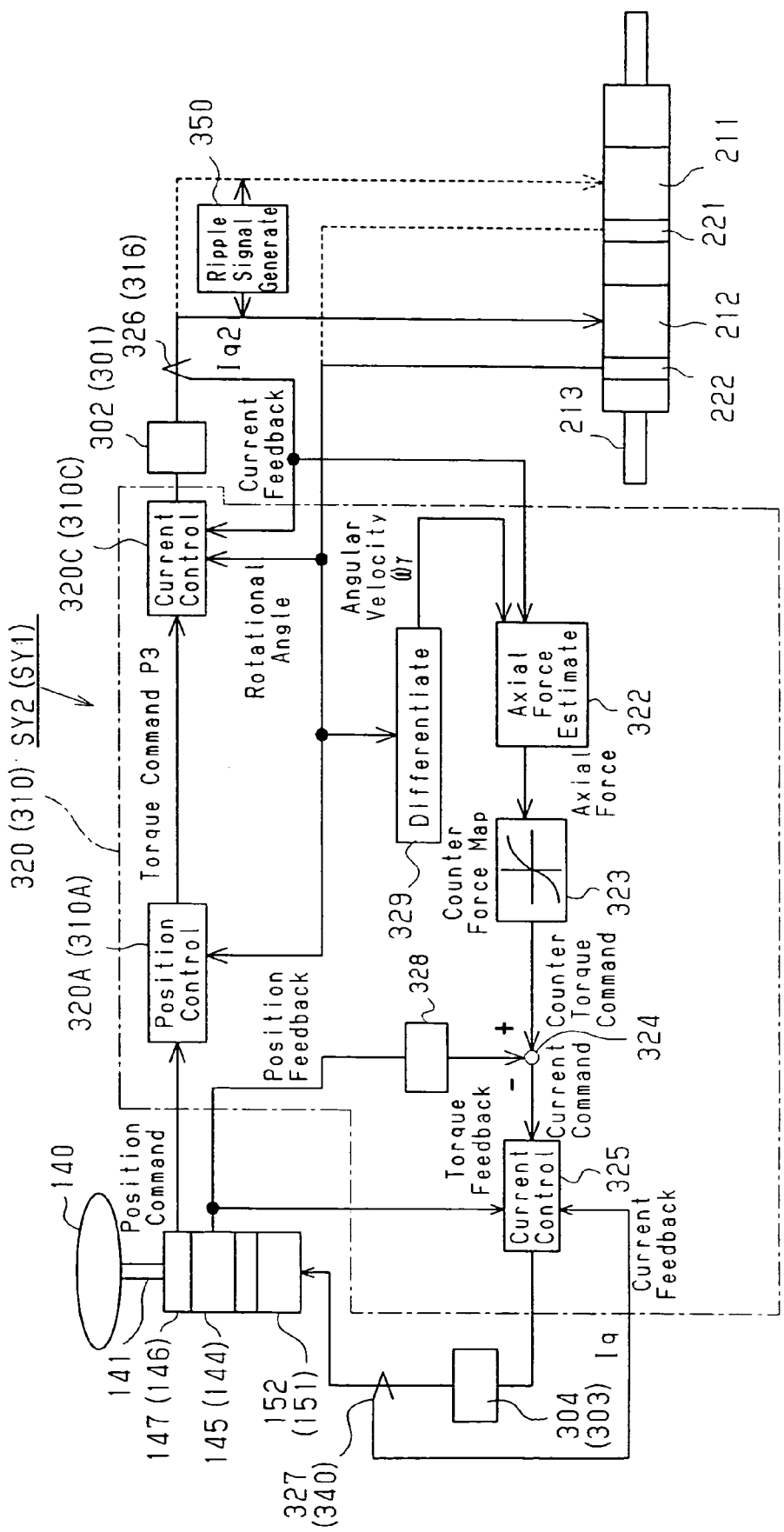

VEHICLE STEERING APPARATUS AND METHOD FOR CONTROLLING THE SAME

CROSS-REFERENCE TO RELATED APPLICATIONS

This application is based upon and claims the benefit of priority from prior Japanese Patent Application No. 2003-088881, filed on Mar. 27, 2003, the entire contents of which are incorporated herein by reference.

BACKGROUND OF THE INVENTION

The present invention relates to a vehicle steering apparatus, and more particularly, to a steer-by-wire steering apparatus. The present invention also pertains to a method for controlling the apparatus.

A steer-by-wire steering apparatus is known as a steering apparatus for controlling steered wheels of vehicles. In a typical steer-by-wire steering apparatus, a steering wheel is mechanically separated from a steering gearbox coupled to steered wheels, or front wheels, of a vehicle. That is, the steering wheel is not directly coupled to the steering gearbox. The steering gearbox is driven by an electric motor in accordance with a detected angle of the steering wheel, or a steering wheel angle.

Such a steering apparatus is provided with a backup control system that allows steering to be reliably performed when the apparatus malfunctions. For example, there has been proposed a backup control system having two redundant control systems (see Japanese Laid-Open Patent Publication No. 2002-37112).

One of the control systems functions as a main control system, while the other control system functions as an auxiliary control system. The auxiliary control system has a similar configuration as the main control system. Each control system includes an electric motor for actuating a steering rod coupled to the steered wheels, a drive circuit for driving the motor, a control circuit for controlling the electric motor through the drive circuit, and sensors necessary for performing control.

When the control systems are functioning normally, the motors of the control systems are driven without interfering each other. The electric motors of the main and the auxiliary control systems actuate the steering rod in accordance with the steering wheel angle.

When the main control system malfunctions, the electric motor of the main control system is stopped. Then, the electric motor of the auxiliary control system actuates the steering rod.

When the one of the control systems malfunctions and the other control system takes over the control, a warning lamp is lit to inform the driver of the malfunction of one of the control systems. However, even if the warning lamp is lit, the steering apparatus gives to the driver the same steering feel as the case where both systems are functioning normally. Therefore, the driver can continue driving and steering with the warning lamp on. In this case, the steering rod is actuated by only one of the control systems. However, it is undesirable that the remaining system continues being used. Thus, it is necessary to cause the driver to realize speedily that there is a malfunction in the steering apparatus.

SUMMARY OF THE INVENTION

Accordingly, it is an objective of the present invention to provide a vehicle steering apparatus that is capable of speedily and reliably causing a driver to realize a malfunction in the steering apparatus. The present invention also pertains to a method for controlling such an apparatus.

To achieve the above objective, the present invention provides a steering apparatus. The steering apparatus is used in a vehicle having a steering wheel and a steering rod. The apparatus includes a steering mechanism and a plurality of control systems. The steering mechanism is mechanically unconnected with the steering wheel. The steering mechanism includes a plurality of steering actuators for actuating the steering rod, and a plurality of counter force actuators for applying steering counter force to the steering wheel. Each control system controls at least one of the steering actuators and at least one of the counter force actuators. Each control system includes at least one detecting means and control means. Each detecting means detects a physical quantity related to the control of the steering mechanism and generates a detection signal representing the physical quantity. The control means controls the corresponding steering actuator and the corresponding counter force actuator in accordance with the detection signal. Determining means determines whether there is an abnormality in each control system. In accordance with a determination result of the determining means, normally functioning one of the control systems controls the corresponding steering actuator and the corresponding counter force actuator. When the determining means determines that there is an abnormality in any one of the control systems, Adding means causes at least one of the steering mechanism and the steering wheel to behave in a manner different from that when all the systems are functioning normally.

According to another aspect of the invention, a method for controlling a steering apparatus is provided. The steering apparatus is used in a vehicle having a steering wheel, a steering rod and a plurality of control systems. The steering rod is mechanically unconnected with the steering wheel. Each control system performs steps of detecting a physical quantity related to the control of the steering rod, generating a detection signal representing the physical quantity, and actuating the steering rod in accordance with the detection signal. Each control system further performs steps of applying a steering counter force to the steering wheel in accordance with the detection signal, and determining whether there is an abnormality in each control system. When it is determined that that there is an abnormality in any one of the control systems, at least one of the steering mechanism and the steering wheel is controlled to behave in a manner different from that when all the systems are functioning normally.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a control block diagram showing a failsafe mode in the steering apparatus of FIG. 1;

FIG. 7 is a block diagram showing a failsafe mode in the steering apparatus of FIG. 6; and FIG. 8 is a block diagram showing a failsafe mode in a steering apparatus according to a fourth embodiment of the present invention.

DETAILED DESCRIPTION OF THE PREFERRED EMBODIMENTS

One embodiment of the present invention will now be described with reference to FIGS. 1 to 4(b).

Figure 1:
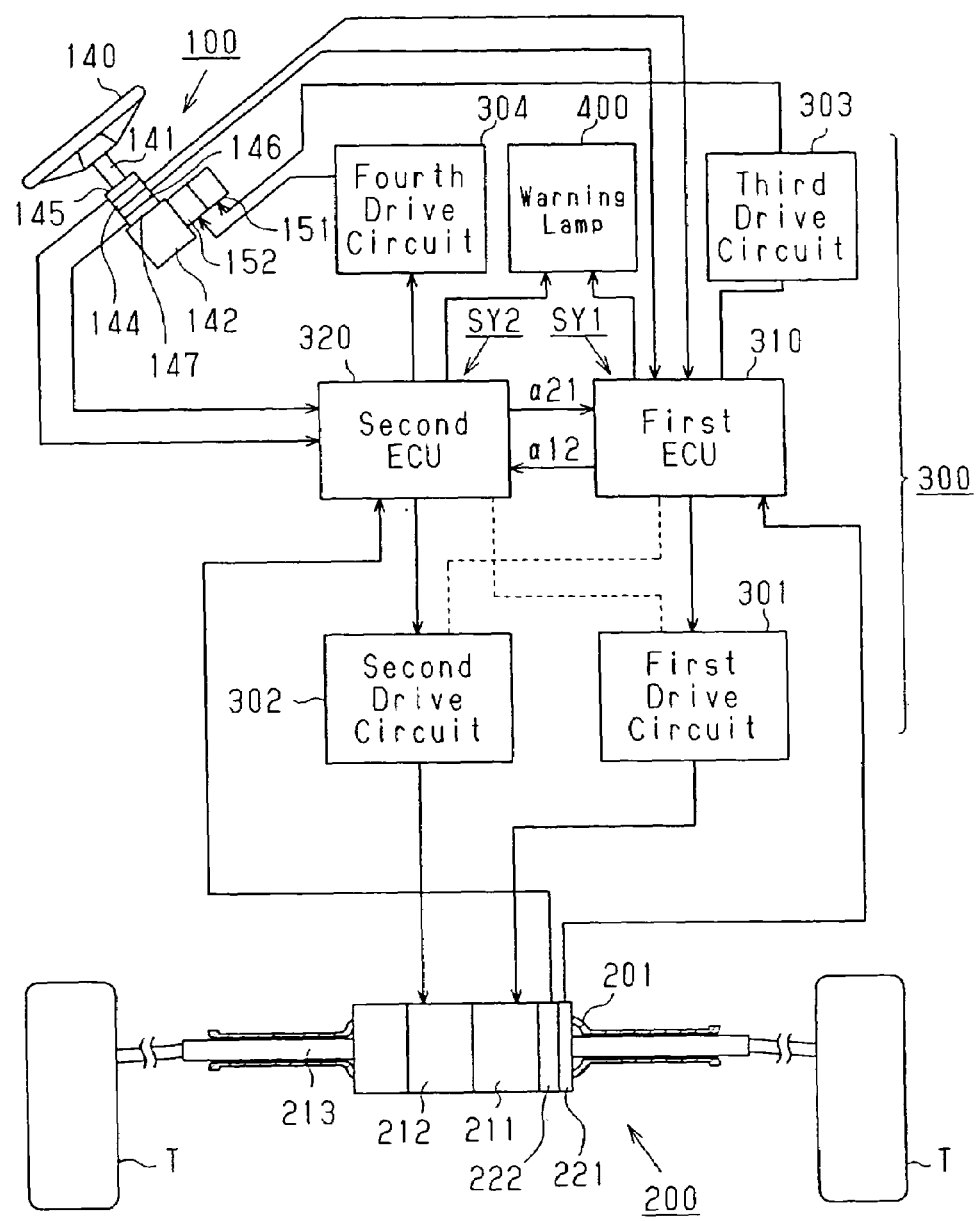
FIG. 1 is a diagrammatic view showing an overall configuration of a steering apparatus according to a first embodiment of the present invention.

A steering apparatus for a vehicle of this embodiment employs a steer-by-wire system. As shown in FIG. 1, the steering apparatus includes a manipulation mechanism 100, a steering mechanism 200, and a controller section 300. The manipulation mechanism 100, the steering mechanism 200, and the controller section 300 form a first control system SY1 and a second control system SY2. The controller section 300 includes a first ECU 310 of the first control system SY1 and a second ECU 320 of the second control system SY2. The first ECU 310 and the second ECU 320 each include a microcomputer.

(Manipulation Mechanism 100) The manipulation mechanism 100 includes a steering wheel 140, a steering shaft 141, a manipulation mechanism housing 142, a first torque sensor 144, a second torque sensor 145, a first steering wheel angle sensor 146, and a second steering wheel angle sensor 147. The steering shaft 141 is rotatably supported by a vehicle body (not shown). The steering shaft 141 is coupled to the steering wheel 140. The manipulation mechanism housing 142 is fixed to the vehicle body. A first counter force motor 151 and a second counter force motor 152, which function as counter force actuators, are fixed to the housing 142. In this embodiment, the motors 151, 152 are three-phase brushless DC motors. Although not illustrated, the motors 151, 152 have a common motor housing. Stators of the motors 151, 152 are respectively fixed to the inner surface of the motor housing. The motors 151, 152 have a common rotor that is rotatable with respect to the stators. The rotor is fixed to an output shaft. The output shaft is coupled to the steering shaft 141 with a reduction gear (not shown) in between.

The first torque sensor 144 and the second torque sensor 145 are capable of detecting turning torque of the steering shaft 141. The torque sensors 144, 145 also function as rotation angle sensors that are capable of detecting an absolute angle of the steering shaft 141. The first torque sensor 144 is electrically connected to the first ECU 310. The second torque sensor 145 is electrically connected to the second ECU 320.

The steering wheel angle sensors 146, 147 are pulse encoders to detect a turning amount of the steering shaft 141, or a steering wheel angle. In other words, the steering wheel angle sensors 146, 147 detect a steering wheel position as a physical quantity. The first steering wheel angle sensor 146 is electrically connected to the first ECU 310. The second steering wheel angle sensor 147 is electrically connected to the second ECU 320.

The steering wheel angle sensors 146, 147 detect a steering wheel angle, which is a physical quantity related to the control of the steering mechanism 200, and outputs a detection signal representing the steering wheel angle.

(Steering Mechanism 200)

The steering mechanism 200 includes a steering mechanism housing 201, a first steering motor 211, and a second steering motor 212. The housing 201 is supported by the vehicle body. The steering motors 211, 212 are three-phase brushless DC motors and function as steering actuators. The steering motors 211, 212 are located on a common axis. Although not illustrated, the steering motors 211, 212 each include a stator located on the inner surface of the housing 201. The steering motors 211, 212 include a common cylindrical steering rotor that rotates with respect to the stators of the steering motors 211, 212. A steering rod 213 extends through the steering rotor. The steering rod 213 does not rotate about its axis but reciprocates along the axis. Rotation of the steering rotor is converted to a linear motion of the steering rod 213 by a conventional motion conversion mechanism. In this embodiment, the motion conversion mechanism is a ball screw mechanism.

At each end of the steering rod 213, a tie rod and a knuckle arm (neither is shown) are provided. Linear motion of the steering rod 213 is transmitted to left and right front wheels of the vehicle, or steered wheels T, with the tie rods and the knuckle arms. Accordingly, the angle of the steered wheels T is changed.

A first rotation angle sensor 221 detects a rotation angle of the first steering motor 211, and a second rotation angle sensor 222 detects a rotation angle of the second steering motor 212. The rotation angle sensors 221, 222 each include a rotary encoder. The rotation angle sensors 221, 222 and the steering motors 211, 212 are arranged in this order along the axis of the steering rotor.

As the steering rotor rotates, the first rotation angle sensor 221 generates a two-phase pulse train signal and a zero-phase pulse train signal, and sends the signals to the first ECU 310. The second rotation angle sensor 222 generates a two-phase pulse train signal and a zero-phase pulse train signal, and sends the signals to the second ECU 320. A two-phase pulse train signal includes two pulse train signals the phases of which are displaced by $\pi/2$ with respect to each other. A zero-phase pulse train signal represents a reference rotation position of the steering rotor. Detection signals (two-phase pulse train signals and zero-phase pulse train signals) generated by the sensors 221, 222 are sampled at a predetermined sampling period and then sent to the corresponding one of the ECUs 310, 320.

Based on the received detection signals, the first ECU 310 and the second ECU 320 compute a rotation angle of the steering rotor relative to the stators in the steering motors 211, 212. The computed rotation angle is correlated with an actual steered wheel angle, which is the actual value of the angle of the steered wheels T, or with the actual position of the steered wheels T. The actual position, or the actual steered wheel angle, corresponds to the steering position of the steering mechanism 200.

The first rotation angle sensor 221 functions as detecting means for detecting a rotation angle of the first steering motor 211, which rotation angle is a physical quantity related to the control of the steering mechanism 200. The second rotation angle sensor 222 functions as detecting means for detecting a rotation angle of the second steering motor 212, which rotation angle is a physical quantity related to the control of the steering mechanism 200.

(Controller Section 300)

In addition to the first ECU 310 and the second ECU 320, the controller section 300 includes first to fourth drive circuits 301 to 304. The first drive circuit 301 drives the first steering motor 211. The second drive circuit 302 drives the second steering motor 212. The third drive circuit 303 drives the first counter force motor 151. The fourth drive circuit 304 drives the second counter force motor 152.

The first to fourth drive circuits 301 to 304 are conventional circuits each including an inverter formed of MOS-FETs for controlling the corresponding one of the three-phase brushless DC motors 151, 152, 211, 212. The first to fourth drive circuits 301 to 304 are connected to a battery (not shown).

Figure 2:
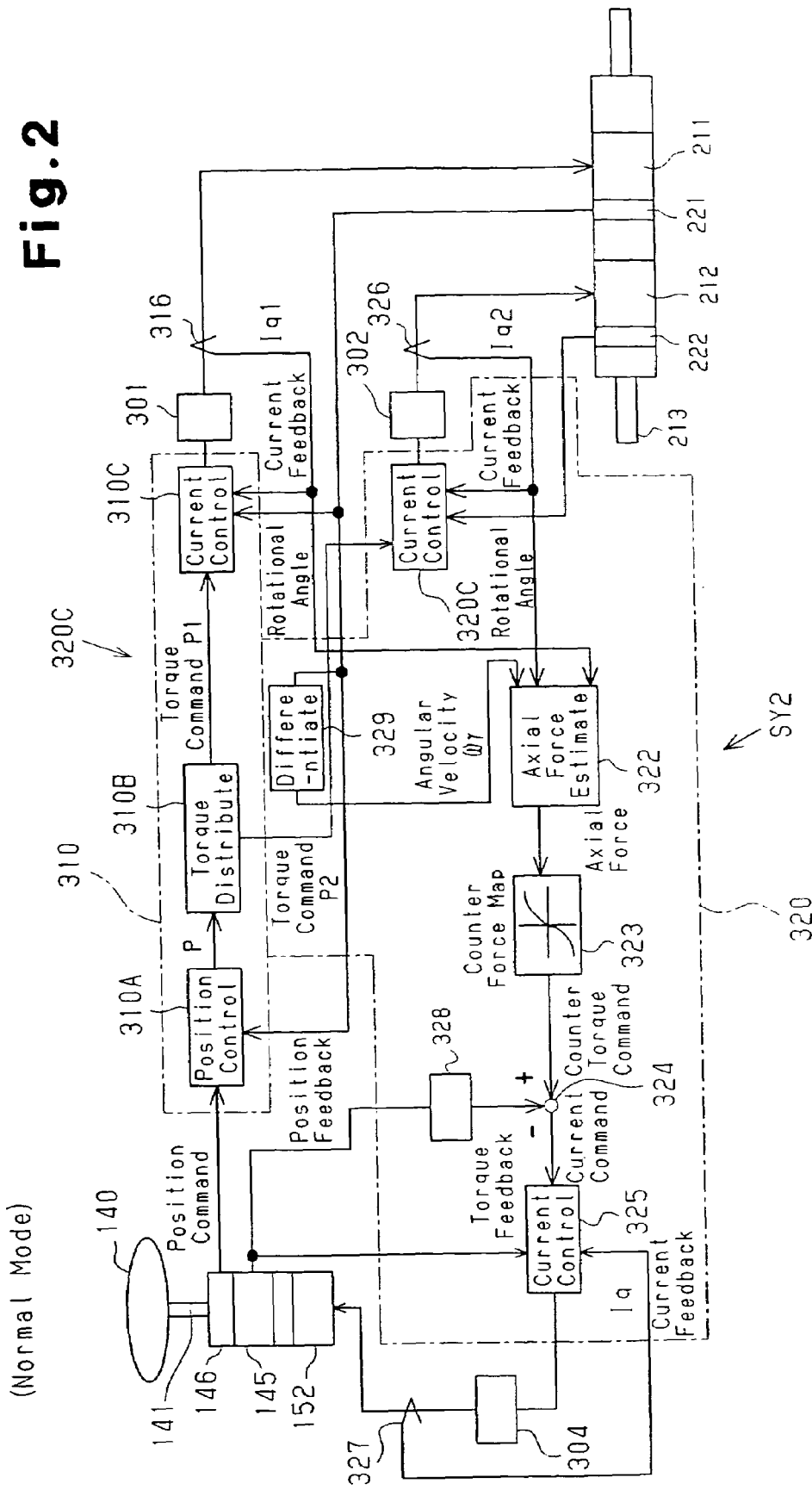
FIG. 2 is a control block diagram showing the steering apparatus of FIG. 1 in a normal mode.

As shown in FIG. 2, a first current sensor 316 detects an actual motor current value Iq1, which is an actual value of a three-phase current of the first steering motor 211. A second current sensor 326 detects an actual motor current value Iq2, which is an actual value of a three-phase current of the second steering motor 212. A current sensor 327 detects an actual motor current value that is an actual value of a three-phase current of the second counter force motor 152. As shown in FIG. 3, a current sensor 340 detects an actual motor current value that is an actual value of a three-phase current of the first counter force motor 151.

The current sensors 316, 326, 327, 340 each detect the corresponding current of all the three phases. However, instead of detecting the current of all the three phase, each of the sensors 316, 326, 327, 340 may detect the current of two of the three phases. In this case, each of the ECUs 310, 320 computes the current corresponding to other one of the three phases based on the detected current of the two phases.

The first control system SY1 includes the first ECU 310, the first steering wheel angle sensor 146, the first torque sensor 144, the first rotation angle sensor 221, the first drive circuit 301, the first steering motor 211, the third drive circuit 303, and the first counter force motor 151. The second control system SY2 includes the second ECU 320, the second steering wheel angle sensor 147, the second torque sensor 145, the second rotation angle sensor 222, the second drive circuit 302, the second steering motor 212, the fourth drive circuit 304, and the second counter force motor 152.

(Mutual Monitoring Function)

The first ECU 310 and the second ECU 320 have a mutual monitoring function, or a watchdog function. According to the mutual monitoring function, the ECUs 310, 320 mutually transmit information necessary for controlling the motors and abnormality determination signals, which are error information. The information necessary for controlling the motors includes rotation angles of the steering motors 211, 212 computed by the ECUs 310, 320, detection signals, or detection values, from sensors of the systems SY1, SY2 corresponding to the ECUs 310, 320. Since the first steering motor 211 and the second steering motor 212 have the common steering rotor, if the systems SY1, SY2 are functioning normally, the rotation angle of the steering rotor computed by the first ECU 310 is equal to the rotation angle of the steering rotor computed by the second ECU 320. Therefore, when the computed rotation angles are equal to each other, the first ECU 310 determines that the second control system SY2 is functioning normally, and the second ECU 320 determines that the first control system SY1 is functioning normally.

When the computed rotation angles are different, either one of the ECUs 310, 320 is malfunctioning. When the second ECU 320 determines that the first control system SY1 is malfunctioning, the second ECU 320 sends an abnormality determination signal, which is error information $\alpha21$, to the first ECU 310. When the first ECU 310 determines that the second control system SY2 is malfunctioning, the first ECU 310 sends an abnormality determination signal, which is error information $\alpha12$, to the second ECU 320.

Each of the systems SY1, SY2 is connected to the power supply with a power supply relay (not shown). For example, when the second ECU 320 determines that the first control system SY1 is malfunctioning, the second control system SY2 turns off the power supply relay of the first control system SY1 to disconnect the first control system SY1 from the power supply, thereby deactivating the first control system SY1. The first control system SY1 functions in the same manner in relation to the second control system SY2.

In this manner, the first ECU 310 functions as means for determining whether the second control system SY2 is malfunctioning, and the second ECU 320 functions as means for determining whether the first control system SY1 is malfunctioning.

A configuration will be discussed below in which the first control system SY1 alone, or in association with the second control system SY2, controls the first steering motor 211 and the first counter force motor 151.

The first ECU 310 of the first control system SY1 computes a target steered wheel angle, or a target position, of the steered wheels T based on the steering wheel angle, or the steering wheel position, detected by the first steering wheel angle sensor 146. Based on the deviation between the target steered wheel angle and the actual steered wheel angle of the steered wheels T, the first ECU 310 computes a torque command, and then distributes the torque command to the first control system SY1 and the second control system SY2 at a predetermined distribution ratio. In a normal state, or when the systems SY1, SY2 are functioning normally, the first ECU 310 controls the first steering motor 211 based on the distributed torque command, and the second ECU 320 controls the second steering motor 212 based on the distributed torque command.

The operation will now be described. The first ECU 310 has various functions such as computing, processing, and memorizing, which functions are enabled with control programs executed by the microcomputer. The ECU 310 includes a normal mode and a failsafe mode. The normal mode is a control mode applied to a case where the first control system SY1 and the second control system SY2 function normally. The failsafe mode of the first control system SY1 is a control mode applied to a case where the first control system SY is functioning normally but the second control system SY2 is malfunctioning.

(Normal Mode of First Control System SY1)

As shown in FIG. 2, the first ECU 310 includes a position controlling section 310A, a torque distributing section 310B, and a current controlling section 310C. In the normal mode, the first ECU 310 uses the sections 310A–310C.

In FIGS. 2, 3, 5–8, a block defined by alternate long and short dashed line does not represent a hardware structure, but represents a control block of the ECUs 310, 320 that functions according to the control programs.

In the normal mode, the first ECU 310 controls the first steering motor 211 with the first drive circuit 301, such that the first steering motor 211 applies to the steering rod 213 a thrust required for causing the actual steered wheel angle of the steered wheels T to correspond to the steering wheel angle detected by the first steering wheel angle sensor 146.

Specifically, the position controlling section 310A receives a position command, which is a steering wheel angle detected by the first steering wheel angle sensor 146. The position controlling section 310A also receives a detection signal from the first rotation angle sensor 221. Based on the received detection signals, the position controlling section 310A computes a rotation angle of the rotor with respect to the stators of the first steering motor 211. A detection signal from the first rotation angle sensor 221 corresponds to position information of the first steering motor 211.

The position controlling section 310A computes the deviation between the computed rotation angle of the first steering motor 211 and the steering wheel position based on the steering wheel angle, which is the position command. The position controlling section 310A multiplies the deviation by a predetermined gain required for the position control, and sends the multiplied value as a torque command P to the torque distributing section 310B. The torque command P corresponds to a first torque command generated based on a computation result of the position control. The position controlling section 310A performs position feedback control to eliminate the deviation between the command value of the position command and the actual rotation angle of the first steering motor 211, which is a feedback value.

The torque distributing section 310B divides the supplied torque command P into a torque command P1 and a torque command P2 at a predetermined distribution ratio. The torque command P1 is supplied to the current controlling section 310C of the first control system SY1. The torque command P2 is supplied to the current controlling section 320C of the second control system SY2. In this embodiment, the distribution ratio in the normal mode is 50:50 (=P1:P2).

Steering control of the first steering motor 211 performed by the first ECU 310 includes position control and torque control. In the position control, the steered wheel angle is controlled to correspond to the steering wheel angle. A thrust required by the steering motor 211 to perform the position control of the steering rod 213, or an output torque of the steering motor 211, is obtained through torque control.

The current controlling section 310C performs the torque control, or current feedback control.

In the normal mode, the current controlling section 310C receives the torque command P1, a detection signal (rotation angle) from the first rotation angle sensor 221, and the three-phase actual motor current value Iq1 of the first steering motor 211 detected by the first current sensor 316. The current controlling section 310C refers to the detection signal (rotation angle) from the first rotation angle sensor 221, and converts the three-phase actual motor current value Iq1 into a two-phase current, thereby obtaining actual currents of d-axis and q-axis. The current controlling section 310C computes deviations between the current commands of d-axis and q-axis by the torque command P1 and the actual currents of d-axis and q-axis. The current controlling section 310C subjects the deviations to proportional-plus-integral control to compute voltage command values of d-axis and q-axis, and converts the voltage command values of d-axis and q-axis to a three-phase voltage command. Based on the three-phase voltage command, the current controlling section 310C sends a PWM motor drive signal to the first drive circuit 301.

According to the motor drive signal from the first ECU 310, the first drive circuit 301 performs switching. That is, the first drive circuit 301 repeatedly supplies and stops current to the first steering motor 211, or repeats PWM control. Accordingly, a motor drive current corresponding to the torque command P1 is supplied to the first steering motor 211 so that the first steering motor 211 is rotated.

In this manner, the first ECU 310 has a control loop in which the first ECU 310 controls the torque of the first steering motor 211 by the actual motor current value Iq1 of each phase obtained by the first current sensor 316. This control loop is referred to as a current loop.

(When First Control System 1 Fails)

When, by the mutual monitoring function, the second control system SY2 determines that the first control system SY1 is malfunctioning, the second control system SY2 turns off the power supply relay of the first control system SY1. This stops current to the sections of the first control system SY1 and deactivates the first control system SY1. Therefore, in this case, the first ECU 310 of the first control system SY1 stops controlling the first steering motor 211.

A configuration will be discussed below in which the second control system SY2 alone, or in association with the first control system SY1, controls the second steering motor 212 and the second counter force motor 152, which are controlled by the second control system SY2.

The second ECU 320 has various functions such as computing, processing, and memorizing, which functions are enabled with control programs executed by the microcomputer. The ECU 320 includes a normal mode and a control mode applied to a case where the first control system SY1 fails.

(Normal Mode of Second Control System SY2)

In the normal mode, as shown in FIG. 2, the second ECU 320 uses the current controlling section 320C, an axial force estimating section 322, a counter torque command generating section 323, a subtractor 324, a current controlling section 325, a torque current converting section 328, and a differentiator 329.

In the normal mode, the current controlling section 320C receives the torque command P2, a detection signal from the second rotation angle sensor 222, and the three-phase actual motor current value Iq2 of the second steering motor 212 detected by the second current sensor 326.

The current controlling section 320C refers to the detection signal (rotation angle) from the second rotation angle sensor 222, and converts the three-phase actual motor current value Iq2 into a two-phase current, thereby obtaining actual currents of d-axis and q-axis. The current controlling section 320C computes deviations between the torque command P2 (current commands of d-axis and q-axis) and the actual currents of d-axis and q-axis. The current controlling section 320C subjects the deviations to proportional-plus-integral control to compute voltage command values of d-axis and q-axis, and subjects the voltage command values of d-axis and q-axis to a three-phase conversion, thereby converting the command values to three-phase voltage command. Based on the three-phase voltage command, the current controlling section 320C sends a PWM motor drive signal to the second drive circuit 302.

According to the motor drive signal from the second ECU 320, the second drive circuit 302 performs switching. That is, the second drive circuit 302 repeatedly supplies and stops current to the second steering motor 212, or repeats PWM control. Accordingly, a motor drive current corresponding to the torque command P2 is supplied to the second steering motor 212 so that the second steering motor 212 is rotated.

In this manner, the second ECU 320 has a control loop in which the second ECU 320 controls the torque of the second steering motor 212 by the actual motor current value Iq2 of each phase obtained by the second current sensor 326. This control loop is referred to as a current loop.

(Application of Counter Force in Normal mode of Second Control System SY2)

Next, a configuration in the normal mode will be described in which the second control system SY2 applies counter force to the steering wheel 140.

The differentiator 329 of the second ECU 320 differentiates a rotation angle detected by the first rotation angle sensor 221 to obtain an angular velocity ωr. The angular velocity ωr is sent to the axial force estimating section 322. The first current sensor 316 sends the actual motor current value Iq1 of each phase of the first steering motor 211 to the axial force estimating section 322. The second current sensor 326 sends the actual motor current value Iq2 of each phase of the second steering motor 212 to the axial force estimating section 322.

Based on the angular velocity ωr and the actual current values Iq1, Iq2 of each phase of the steering motors 211, 212, the axial force estimating section 322 computes (estimates) a steering axial force applied to the steering rod 213. That is, the axial force estimating section 322 receives the angular velocity every at predetermined intervals, and computes the difference between the currently received angular velocity and the previously received angular velocity, thereby computing the angular acceleration. Based on the computed angular acceleration and the sum of the actual motor current values (Iq1+Iq2), the axial force estimating section 322 estimates (computes) the steering axial force.

The axial force estimating section 322 includes memory means (not shown), which is, for example, a ROM. The memory means stores a map representing the relationship between an angular acceleration and a current value corresponding to the angular acceleration in advance. Based on the computed angular acceleration, the axial force estimating section 322 refers to the map of the memory means to compute a current value corresponding to the angular acceleration. Regardless of whether the angular acceleration has a positive value of a negative value, the current corresponding to the angular acceleration is always equal to or more than zero. The axial force estimating section 322 adds the computed currant value corresponding to the angular acceleration to the currently received sum of the actual motor current values (Iq1+Iq2). Based on the resultant current value, the axial force estimating section 322 estimates the axial force. Therefore, when the computed angular acceleration has a positive value, the axial force obtained in the current computation is greater than the axial force obtained in the previous computation.

If the computed angular acceleration is zero, the current value corresponding to the angular acceleration to be added to the sum of the actual current values (Iq1+Iq2) of the current computation is zero.

Conversely, when the computed angular acceleration has a negative value, the axial force estimating section 322 subtracts a current value corresponding to the angular acceleration obtained based on the computed angular acceleration referring to the map from the currently received sum of the actual motor current values (Iq1+Iq2). Based on the resultant current value, the axial force estimating section 322 estimates the axial force. Therefore, in this case, the axial force is less than the previous axial force. The axial force estimating section 322 sends the computed axial force to the counter torque command generating section 323.

The counter torque command generating section 323 includes memory means (not shown), which is, for example, a ROM. The memory means stores a counter force map representing the relationship between an axial force and a target current required for generating a counter force corresponding to the axial force. Based on the axial force computed by the axial force estimating section 322, the counter torque command generating section 323 obtains a target current by referring to the counter force map of the memory means. The target current functions as a control amount and a counter torque command. The counter torque command generating section 323 sends the computed counter torque command to the subtractor 324.

The torque current converting section 328 converts the turning torque detected by the second torque sensor 145 to a current value and sends the current value to the subtractor 324.

The subtractor 324 computes the deviate between the current value sent by the torque current converting section 328 and the counter torque command. The subtractor 324 uses the computed deviation as a current command for counter torque and sends it to the current controlling section 325. The current command for counter torque includes current commands of d-axis and q-axis.

As described above, the second ECU 320 has a control loop in which the second ECU 320, based on the turning torque detected by the second torque sensor 145, performs a torque feedback control.

The current controlling section 325 receives the current command for counter torque, the rotation angle detected by the second torque sensor 145, and a three-phase actual current value Iq3 of the second counter force motor 152 detected by the current sensor 327.

The current controlling section 325 refers to a rotation angle of the second torque sensor 145, and converts the three-phase actual motor current value Iq3 into a two-phase current, thereby obtaining actual currents of d-axis and q-axis. The current controlling section 325 computes deviations between the current commands of d-axis and q-axis obtained from the current command for counter torque and the corresponding actual currents of d-axis and q-axis. The current controlling section 325 subjects the deviations to proportional-plus-integral control to compute voltage command values of d-axis and q-axis, and converts the voltage command values of d-axis and q-axis to three-phase voltage commands. Based on the three-phase voltage command, the current controlling section 325 sends a PWM motor drive signal to the fourth drive circuit 304. The fourth drive circuit 304 is controlled by the motor drive signal from the second ECU 320 and performs switching, or repeatedly supplies and stops current to the second counter force motor 152. That is, by performing PWM control, the fourth drive circuit 304 supplies a motor drive current corresponding to the current command for counter torque to the second counter force motor 152 so that the motor 152 rotates.

In this manner, the second ECU 320 of the controller section 300 has a control loop in which the second ECU 320 controls the counter torque by the three-phase actual motor current value Iq3 of the second counter force motor 152 detected by the current sensor 327. This control loop is referred to as a current loop.

The second counter force motor 152 is controlled through the counter torque control and applies a counter torque (steering counter force) to the steering wheel 140, in which the direction of the counter torque is opposite to the steering direction. As a result, to turn the steering wheel 140, the driver needs to apply a turning torque to the steering wheel 140 against the counter force generated by the second counter force motor 152.

In the normal mode, since the second ECU 320 has the axial force estimating section 322 and the counter torque command generating section 323, the second ECU 320 functions as means for setting a control amount of the second counter force motor 152.

(Failsafe Mode of Second Control System SY2)

When, by the mutual monitoring function of the second control system SY2, the second ECU 320 determines that the first control system SY1 fails, the second ECU 320 enters the failsafe mode. In the failsafe mode, the second ECU 320 turns off the power supply relay of the first control system SY1 to stop supplying current to the parts of the first control system SY1 to deactivate the first control system SY1. At the same time, the second ECU 320 lights a warning lamp 400 shown in FIG. 1. The warning lamp 400 is located in front of the driver's seat.

In this case, the first ECU 310 of the first control system SY1 stops controlling the first steering motor 211.

In the failsafe mode, as shown in FIG. 3, the second ECU 320 uses a position controlling section 320A, the current controlling section 320C, the axial force estimating section 322, the counter torque command generating section 323, the subtractor 324, the current controlling section 325, the torque current converting section 328, a additional counter force setting section 330, an adder 331, and the differentiator 329.

In the failsafe mode of the second ECU 320, a steering control of the second steering motor 212 performed by the second ECU 320 includes a position control for controlling a steered angel to correspond to a steering wheel angle, and a torque control for causing the second steering motor 212 to generate an output torque that the steering rotor requires for the position control.

That is, in the failsafe mode, the second ECU 320 controls the second steering motor 212 with the second drive circuit 302 such that the angle of the steered wheels T corresponds to a steering wheel angle detected by the second steering wheel angle sensor 147, and that a thrust required by the steering rotor for realizing the steered wheel angle is obtained.

Specifically, the position controlling section 320A receives the steering wheel angle detected by the second steering wheel angle sensor 147 and a direction signal from the second rotation angle sensor 222. Based on this signal, the position controlling section 320A computes a rotation angle of the steering rotor relative to the stators. A detection signal from the second rotation angle sensor 222 corresponds to position information of the second steering motor 212.

The position controlling section 320A computes the deviation between the computed rotation angle of the second steering motor 212 and the steering wheel position based on the steering wheel angle, which is the position command. The position controlling section 320A multiplies the deviation by a predetermined gain required for position control, and sends the multiplied value as a torque command P3 to the current controlling section 320C.

The position controlling section 320A performs the position control such that the deviation between the command value of the position command and the rotation angle of the second steering motor 212, which is a feedback value, is eliminated. The torque command value P3 is determined in the following manner.

In the failsafe mode of the second ECU 320, the first steering motor 211 is not actuated, and the steering rotor is actuated only the second steering motor 212. While the vehicle is running, the torque command P3 is set such that the range of the steered wheel angle by the thrust (output torque) generated only by the second steering motor 212 is substantially the same as the range of the steered wheel angle when the systems SY1, SY2 of the steering apparatus are functioning normally while the vehicle is running. Even if the thrust only by the steering motor 212 in the failsafe mode is less than the thrust by the steering motors 211, 212 when the systems SY1, SY2 are functioning normally, the setting is executed unhindered since the surface resistance is small while the vehicle is running. In this embodiment, the torque command P3 has the same value as the torque command P2 of the normal mode.

The surface resistance in stationary steering is greater than the surface resistance when the vehicle is running. Therefore, the torque command P3 is set such that the range of the steered wheel angle by the thrust generated only by the second steering motor 212 in stationary steering is narrower than the range of the steered wheel angle when the systems SY1, SY2 of the steering apparatus are functioning normally.

The current controlling section 320C receives the torque command P3, a detection signal from the second rotation angle sensor 222, and the actual motor current value Iq2 of each phase of the second steering motor 212 detected by the second current sensor 326. As in the normal mode, the current controlling section 320C computes the motor drive signal based on the torque command P3, a detection signal from the second rotation angle sensor 222, and the actual motor current value Iq2, and sends the motor drive signal to the second drive circuit 302.

The second drive circuit 302 is controlled by the motor drive signal from the second ECU 320 and performs switching. Specifically, the second drive circuit 302 repeatedly supplies and stops current to the second steering motor 212, or performs PWM control. Accordingly, the second drive circuit 302 supplies motor drive current that corresponds to the torque command P3 to the second steering motor 212 so that the second steering motor 212 rotates.

In this manner, the second ECU 320 has a control loop in which the second ECU 320 controls the torque of the second steering motor 212 by the actual motor current value Iq2 of each phase detected by the second current sensor 326. This control loop is referred to as a current loop.

A current loop gain of the second ECU 320 in the failsafe mode is greater than a current loop gain in the normal mode. Thus, the response of the steering apparatus in relation to the manipulation of the steering wheel 140 is not degraded. The following performance of the steering apparatus relative to manipulation of the steering wheel 140 is not degraded, either.

As described above, in the failsafe mode, the current controlling section 320C performs current control such that the deviation between the torque command P3 and the feedback value, or the current value Iq2 of the second steering motor 212, is eliminated. The current control corresponds to the torque control.

(Application of Counter Force by Second Control System SY2 in Failsafe Mode)

A configuration in the failsafe mode of the second control system SY2 will be described in which the second control system SY2 applies counter force to the steering wheel 140. Like or the same reference numerals are given to those components that are like or the same as the corresponding components of the normal mode. Mainly, the differences from the normal mode will be discussed below.

In addition to the configuration for applying counter force in the normal mode, the second control system SY2 has an additional counter force setting section 330 and an adder 331 as shown in FIG. 3 to perform the failsafe mode. The second ECU 320 and the second counter force motor 152 function as a part of adding means.

The additional counter force setting section 330 includes memory means (not shown), which is, for example, a ROM. The memory means stores an additional counter force setting value in advance. The additional counter force setting section 330 reads the additional counter force setting value from the memory means and sends the setting value to the adder 331. The adder 331 is located between the subtractor 324 and the counter torque command generating section 323. The adder 331 adds the additional counter force setting value to the a counter torque command (target current) outputted by the counter torque command generating section 323, and sends the resultant to the subtractor 324 as a new counter torque command value (target current). Therefore, a counter force generated by the second counter force motor 152 based on the new counter torque command is greater than the counter force generated based only on the counter torque command generated by the counter torque command generating section 323.

As in the normal mode, the new counter torque command is computed by the subtractor 324. The computed value is converted to a motor drive signal by the current controlling section 325 and sent to the fourth drive circuit 304. The fourth drive circuit 304 is controlled by the motor drive signal from the second ECU 320 and performs switching, or repeatedly supplies and stops current to the second counter force motor 152 (PWM control). Accordingly, the fourth drive circuit 304 supplies a motor drive current corresponding to the current command for counter torque inputted to the current controlling section 325 to the second counter force motor 152 so that the motor 152 rotates.

In this manner, the second counter force motor 152 is controlled so that a counter torque, the direction of which is opposite to the direction in which the steering wheel 140 is being turned, is applied to the steering wheel 140. The counter torque in the failsafe mode is greater than the counter torque in the normal mode by the amount corresponding to the additional counter force setting value. As a result, to turn the steering wheel 140, the driver needs to apply a turning torque that is greater than the turning torque in the normal mode to the steering wheel 140 against the counter torque generated by the second counter force motor 152. That is, steering of the steering wheel 140 becomes heavy. The difference of the steering feel permits the driver to realize that the steering apparatus is malfunctioning.

In this case, the second ECU 320 corresponds to means for controlling a second counter force actuator.

(Failsafe Mode of First Control System SY1)

When, by the mutual monitoring function of the first control system SY1, the first ECU 310 determines that the second control system SY2 is malfunctioning, the first ECU 310 enters the failsafe mode. In the failsafe mode, the first ECU 310 turns off the power supply relay of the second control system SY2 to stop supplying current to the parts of the second control system SY2, thereby deactivating the second control system SY2. At the same time, the first ECU 310 lights the warning lamp 400.

Therefore, in this case, the second ECU 320 of the second control system SY2 stops controlling the second steering motor 212.

The failsafe mode of the first control system SY1 is performed in the similar manner to the failsafe mode of the second control system SY2. Accordingly, reference numerals in the parentheses of FIG. 3 represent components of the first ECU 310 in the failsafe mode of the first control system SY1, each corresponding to a component of the second ECU 320.

Part of wiring that effectively functions between the first drive circuit 301 and the first steering motor 211 in the failsafe mode of the first control system SY1 is shown by a broken line in FIG. 3. Likewise, part of wiring that effectively functions between the position controlling section 310A and the first rotation angle sensor 221 is shown by a broken line.

In the failsafe mode, the first control system SY1 has a configurations corresponding to the sections 322–325, 328–331 as in the failsafe mode of the second control system SY2. The current sensor 340 corresponds to the current sensor 327 of the second control system SY2, and detects the actual motor current value of each phase of the first counter force motor 151. The first ECU 310 and the first counter force motor 151 function as a part of the adding means.

Therefore, if reference numerals are replaced by the reference numerals in the parentheses of FIG. 3, and the descriptions of the sections 322–325, 328–331 are applied to the first ECU 310, description of the failsafe mode of the second control system SY2 and description of the application of counter force performed by the second control system SY2 in the failsafe mode correspond to the description of the failsafe mode of the first control system SY1 and the description of the application of counter force performed by the first control system SY1 in the failsafe mode.

Therefore, in the failsafe mode of the first control system SY1, the first counter force motor 151 is controlled with the third drive circuit 303, so that a counter torque, the direction of which is opposite to the turning direction of the steering wheel 140, is applied to the steering wheel 140. At this time, the counter torque is greater than the counter torque in the normal mode by the amount corresponding to the additional counter force setting value. As a result, as in the case where the driver turns the steering wheel 140 in the failsafe mode of the first control system SY1, the driver, to turn the steering wheel 140, needs to apply a turning torque that is greater than the turning torque in the normal mode against the counter torque generated by the first counter force motor 151. That is, steering of the steering wheel 140 becomes heavy. The difference of the steering feel permits the driver to realize that the steering apparatus is malfunctioning.

In this case, the first ECU 310 corresponds to means for controlling a second counter force actuator.

Figure 4A:
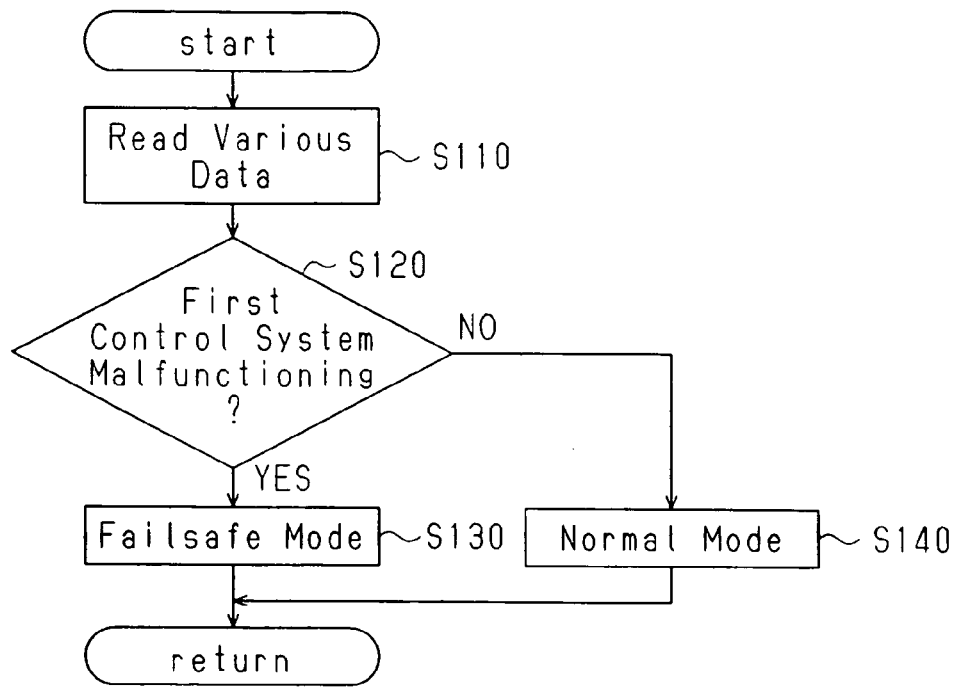
FIG. 4(a) is a flowchart showing a mutual monitoring program executed by a second ECU of the steering apparatus shown in FIG. 1.

FIG. 4(a) is a flowchart showing the mutual monitoring program executed by the microcomputer of the second ECU 320 in the second control system SY2. This program is executed at predetermined intervals.

In step 110 (hereinafter "step" will be represented by the letter S), the second ECU 320 reads various data such as computed values related to the first control system SY1, detection signals from the sensors of the first control system SY1, other information required for controlling the motor, and error information. In S120, the second ECU 320 compares the various data read in S110 with determination values to determine whether the first control system SY1 is malfunctioning. The determination values are threshold values that are previously determined or data in the second control system SY2 corresponding to various data of the first control system SY1.

When determining that the first control system SY1 is malfunctioning in S120, the second ECU 320 proceeds to S130. The second ECU 320 turns off the power supply relay of the first ECU 310 to stop supplying currents to the parts of the first ECU 310, thereby deactivating the first control system SY1. In S130, the second control system SY2 enters the failsafe mode, and temporarily terminates S130. If determining that the first control system SY1 is functioning normally in S120, the second ECU 320 proceeds to S140. In S140, the second control system SY2 enters the normal mode, and temporarily suspends S140.

Figure 4B:
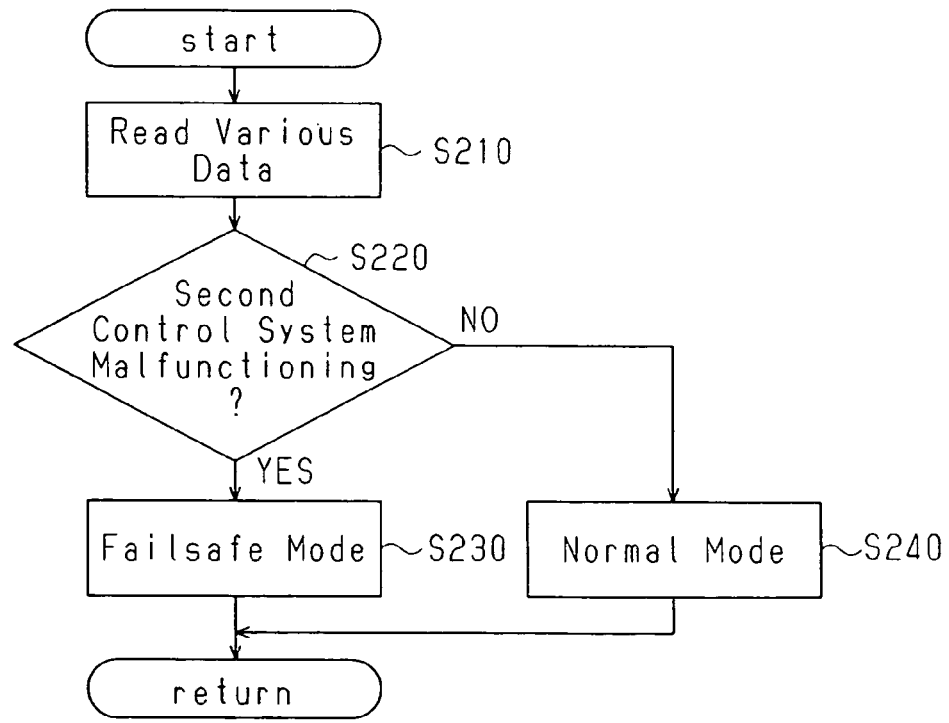
FIG. 4(b) is a flowchart showing a mutual monitoring program executed by a first ECU of the steering apparatus shown in FIG. 1.

FIG. 4(b) is a flowchart showing the mutual monitoring program executed by the microcomputer of the first ECU 310 in the first control system SY1. This program is executed at predetermined intervals.

In S210, the first ECU 310 reads various data such as computed values related to the second control system SY2, detection signals from the sensors of the second control system SY2, other information required for controlling the motors, and error information. In S220, the first ECU 310 compares the various data read with determination values to determine whether the second control system SY2 is malfunctioning.

When determining that the second control system SY2 is malfunctioning in S220, the first ECU 310 proceeds to S230. The first ECU 310 turns off the power supply relay of the second ECU 320 to stop supplying currents to the parts of the second ECU 320, thereby deactivating the second control system SY2. In S230, the first control system SY1 enters the failsafe mode, and temporarily terminates S230. If determining that the second control system SY2 is functioning normally in S220, the first ECU 310 proceeds to S240. In S240, the first control system SY1 enters the normal mode, and temporarily suspends S240.

This embodiment provides the following advantages.

(1) In the steer-by wire steering apparatus of this embodiment, the first control system SY1 includes various detecting means for detecting the rotation angle of the first steering motor 211 and the steering wheel angle (physical quantity), which are related to the control of the steering mechanism 200. The second control system SY2 includes various detecting means for detecting the rotation angle of the second steering motor 212 and the steering wheel angle (physical quantity), which are related to the control of the steering mechanism 200. The detecting means includes the first steering wheel angle sensor 146, the second steering wheel angle sensor 147, the first rotation angle sensor 221, and the second rotation angle sensor 222, or detectors. The first control system SY1 includes the first ECU 310, and the second control system SY2 includes the second ECU 320. According to detection signals generated through manipulation of the steering wheel 140 and detection by the detecting means 146, 221, the first ECU 310 controls the first steering motor 211, which is being controlled by the first control system SY1. According to detection signals generated through manipulation of the steering wheel 140 and detection by the detecting means 147, 222, the second ECU 320 controls the second steering motor 212, which is being controlled by the second control system SY2.

The first ECU 310 determines whether the second control system SY2 is malfunctioning, and the second ECU 320 determines whether the first ECU 310 is malfunctioning. In accordance with the determination results, the ECU of the system that is functioning normally deactivates the system that is malfunctioning, and controls the steering motors 211, 212 that are controlled by its own system.

Further, when determining that the second system SY2 is malfunctioning, the first ECU 310 applies a counter force to the steering wheel 140 with the first counter force motor 151, which counter force is different from that in a case where the systems SY1, SY2 are functioning normally. When determining that the first system SY1 is malfunctioning, the second ECU 320 applies a counter force to the steering wheel 140 with the second counter force motor 152, which counter force is different from that in a case where the systems SY1, SY2 are functioning normally.

As a result, when the first system SY1 is malfunctioning, the second counter force motor 152 operates in a manner that is different from the case where all the systems SY1, SY2 are functioning normally. When the second system SY2 is malfunctioning, the first counter force motor 151 operates in a manner that is different from the case where all the systems SY1, SY2 are functioning normally. That is, when either of the systems SY1, SY2 is malfunctioning, the steering wheel 140 reacts to manipulation by the driver in a manner that is different from the case where all the systems SY1, SY2 are functioning normally. The different steering feel of the steering wheel 140 permits the driver to feel and realize the abnormality of the steering apparatus. As a result, the driver is promptly urged to have the steering apparatus repaired.

(2) The magnitude of the counter torque applied to the steering wheel 140 is greater in the case where either of the systems SY1, SY2 is malfunctioning than in the case where all the system SY1, SY2 are functioning normally.

As a result, the steering of the steering wheel 140 is heavier in the case where either of the systems SY1, SY2 is malfunctioning than in the case where all the systems SY1, SY2 are functioning normally. The different steering feel of the steering wheel 140 permits the driver to realize the abnormality of the steering apparatus. As a result, an abnormality of the steering apparatus is clearly felt by the driver, which promptly urges the driver to have the steering apparatus repaired.

Figure 5:
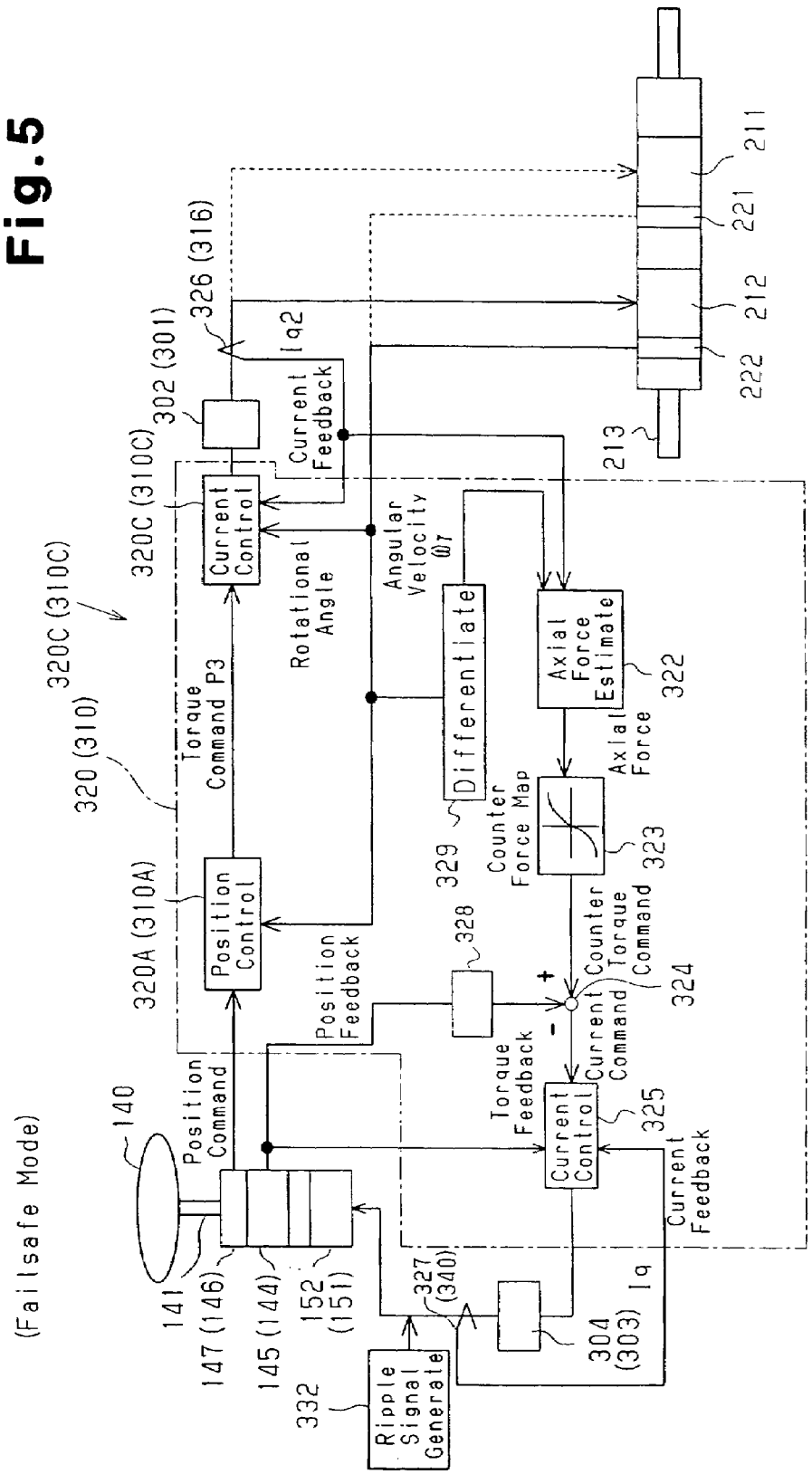
FIG. 5 is a block diagram showing a failsafe mode in a steering apparatus according to a second embodiment of the present invention.

A second embodiment will now be described with reference to FIG. 5.

In the configuration of the second embodiment, like or the same reference numerals are given to those components that are like or the same as the corresponding components of the first embodiment. Mainly, the differences from the first embodiment will be discussed below. FIG. 5 corresponds to FIG. 3 of the first embodiment, and represents a failsafe mode. Like the reference numerals in the parentheses in FIG. 3 of the first embodiment, reference numerals in the parentheses in FIG. 5 represent the failsafe mode of the first control system SY1.

In the second embodiment, a control similar to that of the first embodiment is performed in the normal mode. However, in the failsafe mode, which is performed when either of the systems SY1, SY2 is malfunctioning, a control different from that of the first embodiment is performed.

Specifically, in the second embodiment, the additional counter force setting section 330 and the adder 331 of the first embodiment are omitted. Instead, a torque ripple signal generating section 332, which is a hardware structure, is provided. The torque ripple signal generating section 332 is connected to the lines between the current sensor 327 and the second counter force motor 152, and to the lines between the current sensor 340 and the first counter force motor 151. When normally functioning one of the first ECU 310 and the second ECU 320 enters the failsafe mode, the generating section 332 receives a command from the normally functioning ECU. Then, the generating section 332 adds a torque ripple signal to a motor drive current corresponding to a current command and supplies the resultant to the corresponding one of the counter force motors 151, 152. The torque ripple signal has a wavy waveform.

In this manner, the second counter force motor 152 (or the first counter force motor 151) is controlled with a motor drive current on which the torque ripple signal is superimposed. The motor 152 (151) applies a counter torque to the steering wheel 140, the direction of the counter force being opposite to the turning direction of the steering wheel 140. The torque ripple signal causes the second counter force motor 152 (or the first counter force motor 151) to vibrate. As a result, since the second counter force motor 152 (or the first counter force motor 151) vibrates, the steering wheel 140 and members coupled to the steering wheel 140 are vibrated when the steering wheel 140 is turned.

The second embodiment provides the following advantages.

(1) In the steer-by wire steering apparatus according to the second embodiment, when either of the systems SY1, SY2 is determined to be malfunctioning, the steering wheel 140 is vibrated by the torque ripple signal generated by the torque ripple signal generating section 332.

The driver is therefore informed of an abnormality of the steering apparatus. That is, the driver feels the vibration of the steering wheel 140. This permits the driver to realize the abnormality of the steering apparatus. As a result, the driver is promptly urged to have the steering apparatus repaired.

(2) Further, the driver feels the vibration of the members coupled to the steering wheel 140. The driver is therefore reliably informed of the abnormality of the steering apparatus.

(3) Further, the driver hears noise produced by the vibration of the steering wheel 140 and the coupled members. This reliably informs the driver that the steering apparatus is malfunctioning.

The torque ripple signal generating section 332 corresponds to first torque ripple adding means. The generating section 332 forms the adding means in association with the second counter force motor 152 (or the first counter force motor 151). The torque ripple signal corresponds to a control amount of the torque ripple.

Figure 6:
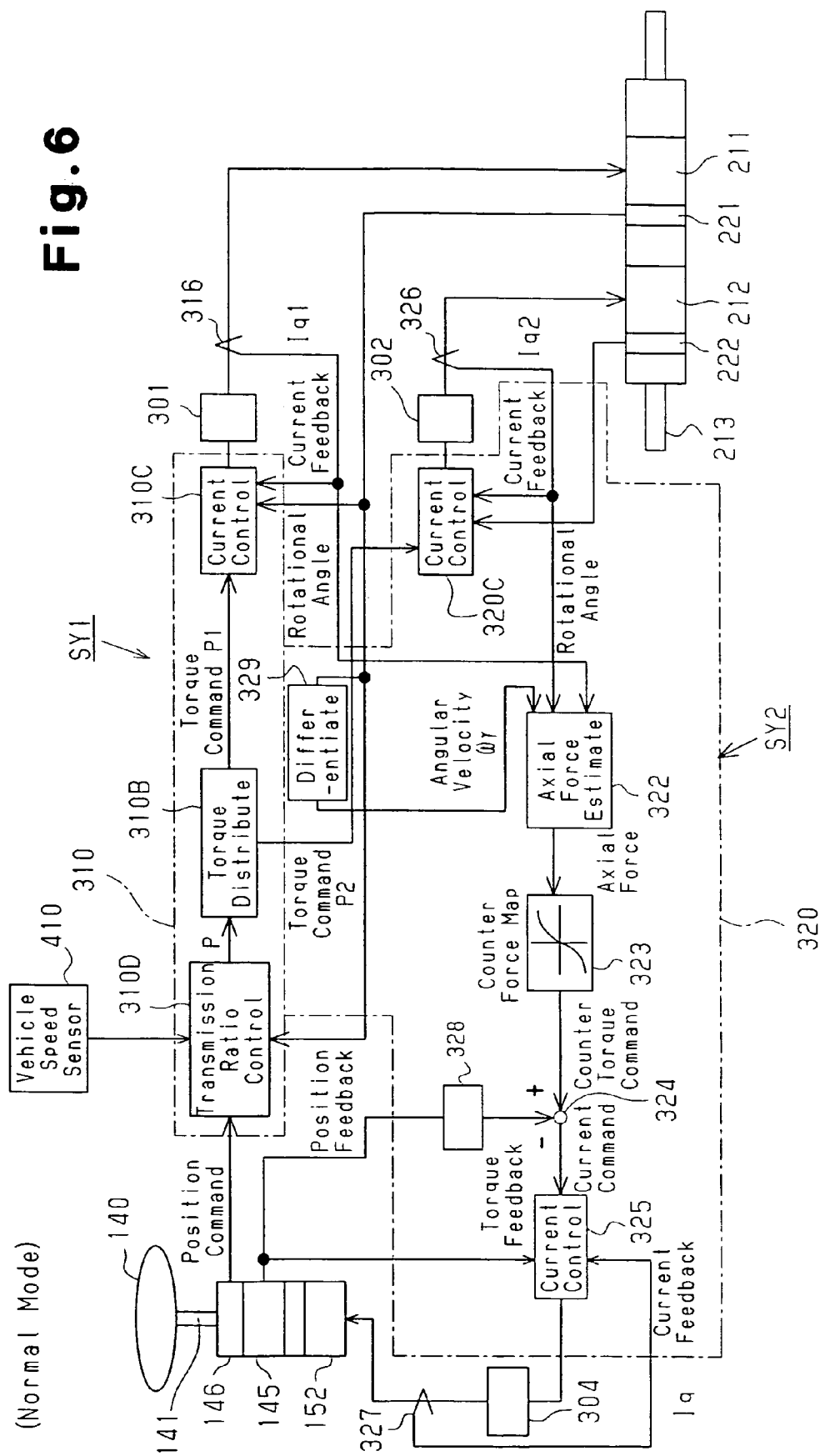
FIG. 6 is a block diagram showing a normal mode in a steering apparatus according to a third embodiment of the present invention.

A third embodiment will now be described with reference to FIGS. 6 and 7.

In the configuration of the third embodiment, like or the same reference numerals are given to those components that are like or the same as the corresponding components of the first embodiment. Mainly, the differences from the first embodiment will be discussed below. In FIG. 7, the effects of the reference numerals in the parentheses are the same as those in FIG. 3 of the first embodiment.

In the first embodiment, the position controlling section 310A of the first ECU 310 and the position controlling section 320A of the second ECU 320 perform position control regardless of the vehicle speed. Unlike the first embodiment, the position controlling sections 310A, 320A are replaced by transmission controlling section 310D, 320D in the third embodiment. Further, a vehicle speed sensor 410 is provided in the third embodiment.

A normal mode will be described with reference to FIG. 6. The transmission controlling section 310D of the first ECU 310 receives a position command, which is a steering wheel angle detected by the first steering wheel angle sensor 146. According to a vehicle speed signal (vehicle speed) from the vehicle speed sensor 410, the transmission controlling section 310D corrects the position command to generate a new position command. The transmission controlling section 310D computes the deviation between the rotation angle of the first steering motor 211, which corresponds to the detection signal from the first rotation angle sensor 221, and the steering wheel position based on the new position command. The transmission controlling section 310D multiplies the computed deviation by a predetermined gain that is necessary for controlling the position and the transmission ratio. The transmission controlling section 310D sends the multiplied value as a torque command P to the torque distributing section 310B.

In this embodiment, a case where the transmission controlling section 310D corrects the position command according to the vehicle speed refers to a case where, if the vehicle speed is low, the transmission controlling section 310D increases the transmission ratio compared to a case where the vehicle speed is high. The transmission ratio represents a ratio of the angle of the steered wheels to the steering wheel angle of the steering wheel 140 (steered wheel angle/steering wheel angle). A case where the vehicle speed is low includes a case where the vehicle speed is zero, or when the vehicle is not moving. Steering when the vehicle is speed is zero is referred to as stationary steering.

In the transmission ratio control, the amount of change in the angle of the steered wheels T relative to the amount of change in the steering wheel angle is greater in a case where the driver turns the steering wheel 140 at a high vehicle speed than in a case where the driver turns the steering wheel 140 at a low vehicle speed. That is, turning amount of the steering wheel 140 relative to the amount of change in the steered wheel angle is less in a case where the vehicle speed is low than in a case where the vehicle speed is high. This facilitates stationary steering.

The components other than the transmission controlling section 310D in the normal mode, such as the torque distributing section 310B, the current controlling section 310C, perform the same processes as in the first embodiment. Description of the processes performed by such components will therefore be omitted.

The failsafe mode will now be described.

As shown in FIG. 7, in the failsafe mode of the second ECU 320, the transmission controlling section 320D of the second ECU 320 receives a position command, which is a steering wheel angle detected by the second steering wheel angle sensor 147. According to a vehicle speed signal (vehicle speed) from the vehicle speed sensor 410, the transmission controlling section 320D corrects the position command to generate a new position command. The transmission controlling section 320D computes the deviation between the rotation angle of the second steering motor 212, which corresponds to the detection signal from the second rotation angle sensor 222, and the steering wheel position based on the new position command. The transmission controlling section 320D multiplies the computed deviation by a predetermined gain that is necessary for controlling the position and the transmission ratio. The transmission controlling section 320D sends the multiplied value as a torque command P3 to the current controlling section 320C.

In this embodiment, a case where the transmission controlling section 320D corrects the position command according to the vehicle speed refers to a case where, if the vehicle speed is low, the transmission controlling section 320D increases the transmission ratio compared to a case where the vehicle speed is high. The transmission ratio in the failsafe mode when the vehicle speed is low is less than the transmission ratio in the normal mode when the vehicle speed is low.

That is, when the driver turns the steering wheel 140, the amount of change in the angle of the steered wheels T relative to the amount of change in the steering wheel angle is greater when the vehicle speed is low than when the vehicle speed is high. That is, the turning amount of the steering wheel 140 relative to the amount of change in the angle of the steered wheels T is less in a case where the vehicle speed is low than in a case where the vehicle speed is high. However, the turning amount of the steering wheel 140 relative to the amount of change in the steered wheel angle is increased by a greater amount at a low vehicle speed in the failsafe mode than at a low vehicle speed in the normal mode.

The components other than the transmission controlling section 320D in the failsafe mode, such as the current controlling section 320C, perform the same processes as in the first embodiment. Description of the processes performed by such components will therefore be omitted.

The failsafe mode of the first control system SY1 is performed in the similar manner to the failsafe mode of the second control system SY2. The description of the failsafe mode of the first control system SY1 is therefore omitted. In FIG. 7, reference numerals in the parentheses represent the components of the first ECU 310 that correspond to the components of the second ECU 320.

Regarding the failsafe mode of the first control system SY1, part of wiring that effectively functions between the first drive circuit 301 and the first steering motor 211 in parentheses is shown by a broken line in FIG. 7. Likewise, part of wiring that effectively functions between the transmission controlling section 310D in the parentheses and the first rotation angle sensor 221 is shown by a broken line.

The third embodiment provides the following advantages.

(1) In the steer-by-wire steering apparatus according to the third embodiment, the first ECU 310 and the second ECU 320 of the first control system SY1 and the second control system SY2 control the steering motors 211, 212 such that the transmission ratio is changed according to the vehicle speed.

When either of the systems SY1 and SY2 is determined to be malfunctioning, the ECU of the normally functioning system controls the steering motors 211, 212 under its control such that the transmission ratio is different from the transmission ratio in the control performed when the systems SY1, SY2 are functioning normally.

Particularly in this embodiment, in the failsafe mode, the transmission ratio is less than that in the normal mode. This increases the turning amount of the steering wheel 140 at a low vehicle speed, thereby degrading the steering performance at a low vehicle speed. That is, the maneuverability of the vehicle is degraded when the vehicle speed is low. The behavior of the vehicle, which is different than a normal condition, informs the driver of an abnormality in the steering apparatus.

Typically, a vehicle turns at a low speed and the turning amount of a steering wheel is greater at a low vehicle speed than at a high vehicle speed. Therefore, degrading the maneuverability of the steering wheel 140 at a low vehicle speed where the turning amount is great permits the driver to easily realize an abnormality of the steering apparatus. As a result, the driver is promptly urged to have the steering apparatus repaired.

A fourth embodiment will now be described with reference to FIG. 8.

In the configuration of the fourth embodiment, like or the same reference numerals are given to those components that are like or the same as the corresponding components of the first embodiment. Mainly, the differences from the first embodiment will be discussed below. In FIG. 8, the effects of the reference numerals in the parentheses are the same as those in the first embodiment of the first ECU 310 in FIG. 3.

In the fourth embodiment, a control similar to that of the first embodiment is performed in the normal mode. In the failsafe mode, which is performed when either of the systems SY1, SY2 is malfunctioning, a control different from that of the first embodiment is performed.

Specifically, in the fourth embodiment, the additional counter force setting section 330 and the adder 331 of the first embodiment are omitted. Instead, a torque ripple signal generating section 350, which is a hardware structure, is provided. The torque ripple signal generating section 350 is connected to the lines between the second current sensor 326 and the second steering motor 212, and to the lines between the first current sensor 316 and the first steering motor 211.

When normally functioning one of the ECUs 310 and 320 enters the failsafe mode, the generating section 350 receives a command from the normally functioning ECU. Then, the generating section 350 adds a torque ripple signal to a motor drive current corresponding to the torque command P3, or superimposes the torque ripple signal onto the motor drive current. The generating section 350 sends the motor drive current, on which the torque ripple signal is superimposed, to the second steering motor 212 (of the first steering motor 211). The torque ripple signal has a wavy waveform.

In this manner, the second steering motor 212 (or the first steering motor 211) is vibrated with a motor drive current on which the torque ripple signal is superimposed. This vibrates the steering mechanism 200. As a result, the vibration of the steering mechanism 200 and the noise of the vibration inform the driver of an abnormality in the steering apparatus.

In the fourth embodiment, the torque ripple signal generating section 350 corresponds to second torque ripple adding means. The generating section 350 forms a part of the adding means in association with the first steering motor 211 or the second steering motor 212. The torque ripple signal corresponds to a control amount of the torque ripple.

The fourth embodiment provides the following advantages.

(1) In the steer-by wire steering apparatus according to the fourth embodiment, when either of the systems SY1, SY2 is determined to be malfunctioning, the torque ripple signal generating section 350 sends a torque ripple signal to the first steering motor 211 or the second steering motor 212.

As a result, the first steering motor 211 or the second steering motor 212 vibrate. The steering mechanism 200 is vibrated, accordingly. As a result, the vibration of the steering mechanism 200 informs the driver of an abnormality in the steering apparatus. This permits the driver to realize the abnormality of the steering apparatus. As a result, the driver is promptly urged to have the steering apparatus repaired.

(2) Further, since the steering mechanism 200 is vibrated, noise of vibration reliably and promptly urges the driver to have the steering apparatus repaired.

The invention may be embodied in the following forms.

In the first embodiment, a yaw rate sensor and/or a lateral acceleration sensor may be connected to the axial force estimating section 322 of the second ECU 320. In this case, the axial force estimating section 322 changes the counter torque according to a yaw rate and/or a lateral acceleration detected by such sensors.

In the illustrated embodiments, the two control systems SY1, SY2 control the steering motors 211, 212. The present invention may be applied to a configuration in which three or more systems control three or more steering motors.

In this case, for example, when one of the systems fails, a counter motor is controlled to increase counter force, or torque ripple is added to the counter torque. When only one of the control systems is functioning normally and the other systems are malfunctioning, the counter force of the counter force motor may be increased, or torque ripple may be added to the counter force.

In the first embodiment, the additional counter force setting value read by the additional counter force setting section 330 is set regardless of the vehicle speed. However, the additional counter force setting value read by the additional counter force setting section 330 may be variable according to the vehicle speed. For example, the additional counter force setting map stored in the memory means of the additional counter force setting section 330 is previously designed such that the additional counter force changes according to the vehicle speed. Then, a vehicle speed sensor is added to the systems SY1 and SY2, so that the first ECU 310 and the second ECU 320 input a vehicle speed signal (vehicle speed). The additional counter force setting section 330 reads an additional counter force setting value corresponding to the vehicle speed from the map. In this case, the counter force is controlled to be greater for a lower vehicle speed.

The first embodiment may be combined with the third embodiment. In this case, the advantages of the first embodiment and the advantages of the third embodiment are simultaneously obtained.

The first embodiment may be combined with the fourth embodiment. In this case, the advantages of the first embodiment and the advantages of the fourth embodiment are simultaneously obtained.

The second embodiment may be combined with the third embodiment. In this case, the advantages of the second embodiment and the advantages of the third embodiment are simultaneously obtained.

The second embodiment may be combined with the fourth embodiment. In this case, the advantages of the second embodiment and the advantages of the fourth embodiment are simultaneously obtained.

The third embodiment may be combined with the fourth embodiment. In this case, the advantages of the third embodiment and the advantages of the fourth embodiment are simultaneously obtained.

The first ECU 310 may determine whether the first control system SY1, to which the first ECU 310 belongs, has an abnormality. Likewise, the second ECU 320 may determine whether the second control system SY2, to which the second ECU 320 belongs, has an abnormality.

The present examples and embodiments are to be considered as illustrative and not restrictive and the invention is not to be limited to the details given herein, but may be modified within the scope and equivalence of the appended claims.

The invention claimed is:

1. A steering apparatus used in a vehicle having a steering wheel and a steering rod, the apparatus comprising:
   a steering mechanism mechanically unconnected with the steering wheel, wherein the steering mechanism includes a plurality of steering actuators for actuating the steering rod, and a plurality of counter force actuators for applying steering counter force to the steering wheel;
   a plurality of control systems, wherein each control system controls at least one of the steering actuators and at least one of the counter force actuators, wherein each control system includes at least one detecting means, which detects a physical quantity related to the control of the steering mechanism and generates a detection signal representing the physical quantity, and control means, which controls the corresponding steering actuator and the corresponding counter force actuator in accordance with the detection signal;
   determining means for determining whether there is an abnormality in each control system, wherein, in accordance with a determination result of the determining means, normally functioning one of the control systems controls the corresponding steering actuator and the corresponding counter force actuator; and
   adding means, wherein, when the determining means determines that there is an abnormality in any one of the control systems, the adding means causes at least one of the steering mechanism and the steering wheel to behave in a manner different from that when all the systems are functioning normally.

2. The steering apparatus according to claim 1, wherein, in accordance with a determination result of the determining means, the control means of the normally functioning control system deactivates the control system having an abnormality.

3. The steering apparatus according to claim 2, wherein the control means of the normally functioning control systems stops current supply to the control system having an abnormality.

4. The steering apparatus according to claim 1, wherein, when there is an abnormality in any one of the control systems, the adding means controls the corresponding counter force actuator such that a counter force is applied to the steering wheel, which counter force is greater than a counter force that is applied to the steering wheel by the counter force actuator when all the systems are functioning normally.

5. The steering apparatus according to claim 1, wherein, when there is an abnormality in any one of the control systems, the adding means controls the corresponding counter force actuator such that an oscillating counter force is applied to the steering wheel.

6. The-steering apparatus according to claim 1, wherein the steering rod is coupled to a steered wheel, wherein, when all the systems are functioning normally, the control means of at least one of the control systems controls the corresponding steering actuator such that a transmission ratio, which is a ratio of an angle of the steered wheel to an angle of the steering wheel, changes according to a vehicle speed, and wherein, when there is an abnormality in any one of the control systems, the adding means controls the corresponding steering actuator such that the transmission ratio is different from that when all the systems are functioning normally at the same vehicle speed.

7. The steering apparatus according to claim 1, wherein, when there is an abnormality in any one of the control systems, the adding means controls the steering actuator that is controlled by normally functioning control system such that an oscillating driving force is applied to the steering rod.

8. A steering apparatus used in a vehicle having a steering wheel and a steering rod, the apparatus comprising:

a steering mechanism mechanically unconnected with the steering wheel, wherein the steering mechanism includes a plurality of steering actuators for actuating the steering rod, and a plurality of counter force actuators for applying steering counter force to the steering wheel; and a plurality of control systems, wherein each control system controls at least one of the steering actuators and at least one of the counter force actuators, wherein each control system includes at least one detector, which detects a physical quantity related to the control of the steering mechanism and generates a detection signal representing the physical quantity, and a controller, which controls the corresponding steering actuator and the corresponding counter force actuator in accordance with the detection signal, and wherein each controller determines whether there is an abnormality in the corresponding control system or in another control system;

wherein, when it is determined that there is an abnormality in any one of the control systems, the controller of normally functioning one of the control systems causes at least one of the steering mechanism and the steering wheel to behave in a manner different from that when all the systems are functioning normally.

9. The steering apparatus according to claim 8, wherein the controller of the normally functioning control systems stops current supply to the control system having an abnormality.

10. The steering apparatus according to claim 8, wherein, when there is an abnormality in any one of the control systems, the controller of normally functioning one of the control systems controls the corresponding counter force actuator such that a counter force is applied to the steering wheel, which counter force is greater than a counter force that is applied to the steering wheel by the counter force actuator when all the systems are functioning normally.

11. The steering apparatus according to claim 8, wherein, when there is an abnormality in any one of the control systems, the controller of normally functioning one of the control systems controls the corresponding counter force actuator such that an oscillating counter force is applied to the steering wheel.

12. The steering apparatus according to claim 8, wherein the steering rod is coupled to a steered wheel, wherein, when all the systems are functioning normally, at least one of the controllers of the control systems controls the corresponding steering actuator such that a transmission ratio, which is a ratio of an angle of the steered wheel to an angle of the steering wheel, changes according to a vehicle speed, and wherein, when there is an abnormality in any one of the control systems, the controller of normally functioning one of the control systems controls the corresponding steering actuator such that the transmission ratio is different from that when all the systems are functioning normally at the same vehicle speed.

13. The steering apparatus according to claim 8, wherein, when there is an abnormality in any one of the control systems, the controller of normally functioning one of the control systems controls the corresponding steering actuator such that an oscillating driving force is applied to the steering rod.

14. A method for controlling a steering apparatus used in a vehicle having a steering wheel, a steering rod mechanically unconnected with the steering wheel, and a plurality of control systems, wherein each control system performs steps of:

detecting a physical quantity related to the control of the steering rod, and generating a detection signal representing the physical quantity;

actuating the steering rod in accordance with the detection signal;

applying a steering counter force to the steering wheel in accordance with the detection signal; and determining whether there is an abnormality in each control system, wherein, when it is determined that that there is an abnormality in any one of the control systems, at least one of the steering mechanism and the steering wheel is controlled to behave in a manner different from that when all the systems are functioning normally.

15. The controlling method according to claim 14, wherein, when it is determined that there is an abnormality in any one of the control systems, any of the control systems that has an abnormality is deactivated.

16. The controlling method according to claim 15 wherein, when it is determined that there is an abnormality in any one of the control systems, current supply to any of the control systems that has an abnormality is stopped.

17. The controlling method according to claim 14, wherein, when it is determined that there is an abnormality in any one of the control systems, a counter force is applied to the steering wheel, which counter force is greater than a counter force that is applied to the steering wheel when all the systems are functioning normally.

18. The controlling method according to claim 14, wherein, when it is determined that there is an abnormality in any one of the control systems, an oscillating counter force is applied to the steering wheel.

19. The controlling method according to claim 14, wherein the steering rod is coupled to a steered wheel, wherein, when all the systems are functioning normally, a transmission ratio, which is a ratio of an angle of the steered wheel to an angle of the steering wheel, is changed according to a vehicle speed, and wherein, when it is determined that there is an abnormality in any one of the control systems, the transmission ratio is different from that when all the systems are functioning normally at the same vehicle speed.

20. The controlling method according to claim 14, wherein, when it is determined that there is an abnormality in any one of the control systems, an oscillating driving force is applied to the steering rod.

* * * * *